United States Patent [19]

Fujibayashi

[11] Patent Number: 5,486,894
[45] Date of Patent: Jan. 23, 1996

[54] CAMERA WITH EXPOSURE CONTROL INTERLOCKED WITH LENS MOVEMENT

[75] Inventor: Kazuo Fujibayashi, Kanagawa, Japan

[73] Assignee: Canon Kabushiki Kaisha, Tokyo, Japan

[21] Appl. No.: 427,882

[22] Filed: Apr. 26, 1995

Related U.S. Application Data

[63] Continuation of Ser. No. 968,253, Oct. 29, 1992, abandoned.

[51] Int. Cl.$^6$ .................................. G03B 3/10; G03B 7/08
[52] U.S. Cl. ................ 354/446; 354/195.11; 354/195.12; 354/402
[58] Field of Search .................................. 354/446, 435, 354/402, 195.11, 195.12, 271.1, 412, 429, 431, 432, 433, 434, 421, 481, 483

[56] References Cited

U.S. PATENT DOCUMENTS

| | | | |
|---|---|---|---|
| 4,203,661 | 5/1980 | Besenmatter | 354/195.11 |
| 4,285,585 | 8/1981 | Numata | 354/421 |
| 4,451,129 | 5/1984 | Ikari et al. | 354/195.12 |
| 4,708,454 | 11/1987 | Kodaira et al. | 354/195.12 |
| 4,725,864 | 2/1988 | Ogawa et al. | 354/195.12 |
| 4,899,191 | 2/1990 | Maruyama | 354/435 |
| 4,908,643 | 3/1990 | Tamada et al. | 354/400 |
| 4,910,544 | 3/1990 | Nomura | 354/195.12 |
| 4,994,842 | 2/1991 | Itoh et al. | 354/402 |

Primary Examiner—Michael L. Gellner
Assistant Examiner—Eric Nelson
Attorney, Agent, or Firm—Robin, Blecker, Daley & Driscoll

[57] ABSTRACT

A camera comprising an exposure control circuit for controlling the exposure in accordance with the output of a light measuring circuit receptive of light at a different position from that of a photographic lens system, a distance detecting circuit for automatically determining the object distance, the photographic lens system comprising lens groups on either side of a diaphragm whose axial position relative to an image plane is made constant, the front and rear lens groups being moved axially to effect zooming and the one of the lens groups which lies behind the diaphragm being moved axially to effect focusing, and an exposure correction control circuit for detecting the axial position of the rear lens group behind the diaphragm to correct the exposure value obtained from the light measuring circuit when the exposure is controlled.

7 Claims, 3 Drawing Sheets

CAMERA WITH EXPOSURE CONTROL INTERLOCKED WITH LENS MOVEMENT

This is a continuation application under 37 CFR 1.62 of prior application Ser. No. 07/968,253, which was filed on Oct. 29, 1992 now abandoned.

BACKGROUND OF THE INVENTION

1. Field of the Invention

This invention relates to cameras having an external light measuring device and, more particularly, to cameras in which a correction is factored into the exposure value obtained from the light measuring device when exposure is controlled.

2. Description of the Related Art

In recent years, as the camera using a silver-halide film and adapted to beginners, a small-sized, easy-to-handle, compact type is widespread. Yet, even in these compact type cameras, there are an increasing number of cameras of such a model that close-up photography is made possible by increasing a quantity of the total focusing movement.

Even with the electronic camera using a CCD or like photoelectric transducer element as the photographic material, a similar trend to that of the aforesaid camera using a silver-halide film is occurring so that a camera of the small-sized, easy-to-handle, compact type adapted to general users and capable of close-up photography is about to be announced.

And, even these cameras of the compact type are desired to have zooming, automatic exposure, and automatic focusing functions. This tends to put the increase of the complexity of structure of the operating mechanism and the demand for the compact form in conflict with each other.

While the silver-halide film has relatively wide latitude in its development, the exposure latitude of the CCD or like photoelectric transducer is very narrow. In the electronic camera using such a photoelectric transducer, therefore, when shooting, the exposure must be controlled with high accuracy.

Furthermore, to round up the photographic lens in compact form, part of the zooming provision may be made in the lens component behind the diaphragm. With the use of this, when zooming, the virtual effective value of the aperture size, or F-number, changes although the real size of the aperture opening remains unchanged. Hence, it has been the practice to incorporate into the camera a capability of controlling the exposure correction in accordance with the zooming position by increasing or decreasing the size of opening of the diaphragm aperture. But, as for the change of F-number resulting from focusing, from the reason that it is relatively little, and in view of the difficulty of advancing the compact unit production technique, the exposure correcting function for focusing has not been incorporated into the camera.

In the case of focusing by moving the lens component behind the diaphragm, however, because the range of variation with focusing of the F-number is relatively large, particularly for the electronic camera of narrow latitude, or for the camera with which one seeks rich gradation of tone and much more beauty in the picture, there arises a problem, in that the exposure error is so large as not to be acceptable.

SUMMARY OF THE INVENTION

To solve the above-described problem, the present invention has been made. Its object is to provide a camera having exposure correcting means capable of performing adequate exposure correction on the change of F-number resulting not only from zooming but also from focusing.

To achieve this, according to the invention, in an embodiment thereof, the camera is provided with exposure control means for controlling exposure in accordance with an output of light measuring means for measuring light at a different position from that of a photographic lens system and distance detecting means for automatically detecting an object distance. Further, the aforesaid photographic lens system is provided with lens groups on either of the front and rear sides of a diaphragm whose position relative to a focal plane is fixed, wherein zooming is performed by axially moving the front and rear lens groups and focusing is performed by axially moving the rear lens group. Furthermore, the camera is provided with exposure correction control means for detecting the axial position of the rear lens group to correct an exposure value obtained by the aforesaid light measuring means so as to control an exposure.

According to the above-described features, the camera of this invention controls the exposure in accordance with the light value obtained by the light measuring means at a different position from that of the photographic lens and automatically detects the object distance by the distance detecting means.

And, the front and rear lens groups are axially moved on either side of the diaphragm to effect zooming, while the rear lens group behind the diaphragm is moved likewise to effect focusing. And, the axial position of the rear lens group behind the diaphragm is detected. This result is used to control the exposure in such a manner as to correct the exposure control that is based on the light measurement by the light measuring means. Hence, it is made possible to correct the error of the exposure control due to the change of F-number not only in zooming but also in focusing.

Another object of the invention is to provide a camera with a light measuring device capable of simplifying the exposure control system.

To achieve the above-described object, according to the invention, in another embodiment thereof, the camera is provided with varying means for varying the F-number of a light measuring system, and drive means for moving the varying means in association with zooming, so that the F-number of the light measuring system is made variable with zooming, and, based on this, the control of the F-number of the photographic system is made. By this feature, in this embodiment, the necessity of the computing means for finding the change of F-number of the light measuring system resulting from the zooming can be obviated.

Other objects and features of the invention will become apparent from the following written specification and drawings.

DETAILED DESCRIPTION OF THE PREFERRED EMBODIMENTS

Figure 1:
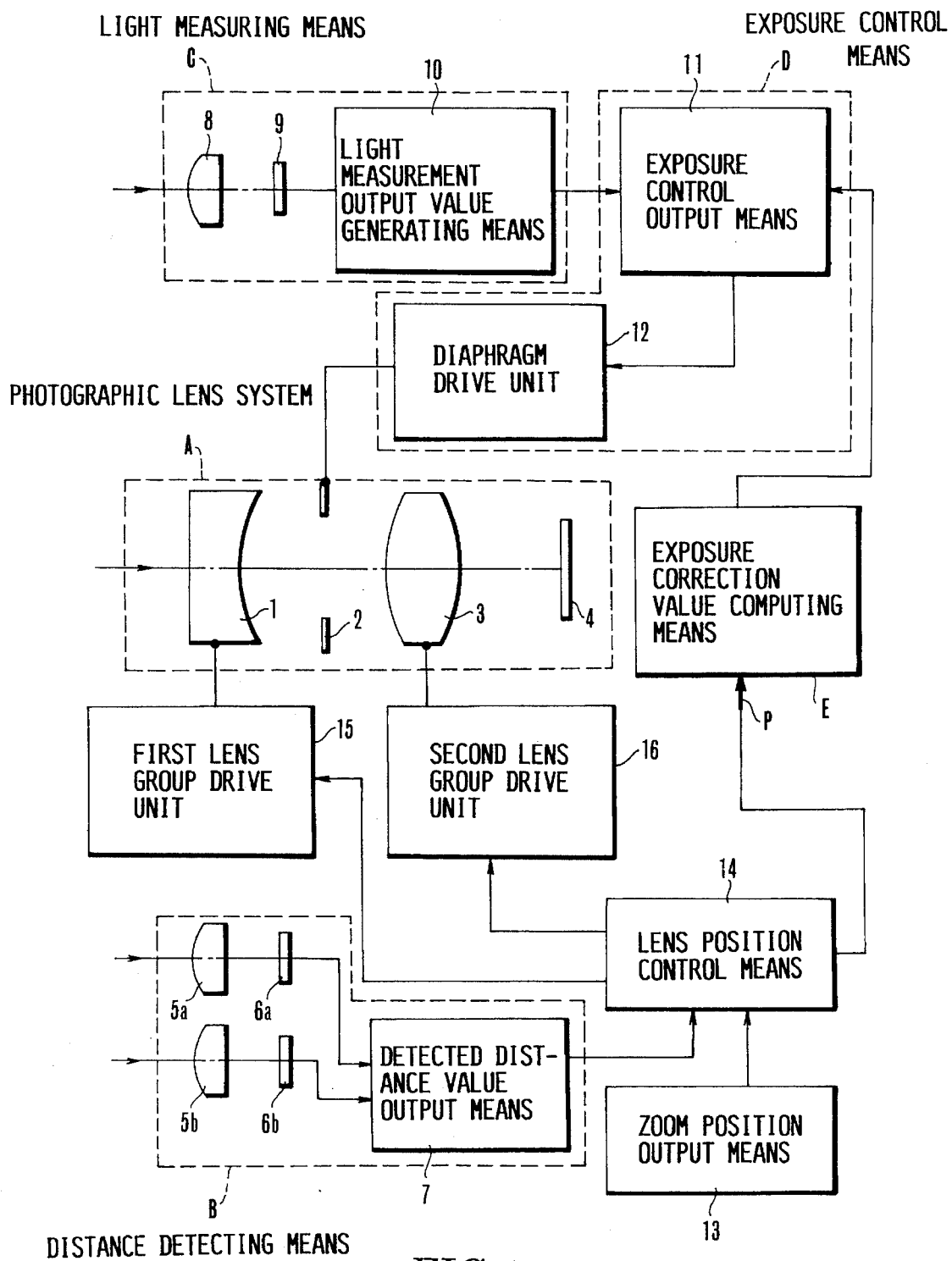
FIG. 1 is a view of the construction of an embodiment of a camera having exposure correction control means according to the invention.

FIG. 1 shows the construction of a camera provided with exposure correction control means, which is an embodiment of the invention. A photographic lens system A is constructed with a first lens group 1, a diaphragm 2 constituting a lens shutter for controlling the size of aperture opening and the shutter speed positioned behind the first lens group 1, a second lens group 3 positioned behind the diaphragm 2, and an image sensor 4 positioned behind the second lens group 3 on an image plane. Incidentally, the position of the diaphragm 2 is made constant relative to the image plane.

Zooming is performed by moving the first lens group 1 from the object side to the image plane side, while simultaneously moving the second lens group 3 from the image plane side to the object side, on a common optical axis. Focusing is performed by moving the second lens group 3 on the optical axis.

It should be noted that the use of such construction and arrangement in the photographic lens system A gives an advantage that the operating mechanism can be simplified in structure, which is advantageous for making the camera in the compact form.

Distance detecting means B comprises image forming lenses 5a and 5b for distance detection, line sensors 6a and 6b and a detected distance value output means 7 for producing an output representing the detected value of the distance. The output means 7 measures the object distance by detecting the image interval between a first image formed on the line sensor 6a by the image forming lens 5a and a second image formed on the line sensor 6b by the image forming lens 5b, and produces the result at its output.

Light measuring means C lies at such a position as not to share a common optical path with the photographic lens system A, and comprises a collection lens 8, a light sensor 9 and a light measurement output value generating means 10 for producing an output representing the measured value of light intensity. The brightness of an object to be photographed is detected by the light sensor 9. The result is sent to the light measurement output generating means 10, where it is amplified so that the output representing the measured light intensity is produced.

Exposure control means D comprises an exposure control output means 11 and a diaphragm drive unit 12. In the prior art, it would have occurred that on receipt of the output of the light measurement output value generating means 10, the exposure control output means 11 determines the values of the aperture size and the shutter speed, and the aperture opening of the diaphragm 2 and a lens shutter are activated by the diaphragm drive unit 12. In a case where the second lens group 3 behind the diaphragm 2 moves as in this embodiment of the invention, the F-number varies depending on the position of the second lens group 3, despite the same diameter of the aperture opening. Therefore, for the exposure value given by the exposure control output means 11, a correction must be made based on the input from the light measuring means C.

The camera further includes a zoom position output means 13, a lens position control means 14, an exposure correction value computing means E, a first lens group drive unit 15 and a second lens group drive unit 16.

Receiving the zoom position indicated by the zoom position output means 13 and the distance to the object output from the detected distance value output means 7, the lens position control means 14 computes the amounts of movement necessary for the first lens group 1 and the second lens group 3. Responsive to these data, the first lens group drive unit 15 moves the first lens group 1, and the second lens group drive unit 16 moves the second lens group 3.

The exposure correction value computing means E receives the position information of the second lens group 3 from the lens position control means 14 and sends the value of exposure correction corresponding to the change of the F-number to the exposure control output means 11.

The exposure control output means 11 applies the value of exposure correction input from the exposure correction value computing means E to the exposure value obtained by the input of the measured light value from the light measuring means C, and activates the diaphragm drive unit 12 to control the size of aperture opening of the diaphragm 2 and/or the speed of the lens shutter, that is, the exposure amount.

By such arrangement and operation, the exposure control can be made in accordance with the brightness of the object, each zoom position and each object distance.

Figure 2:
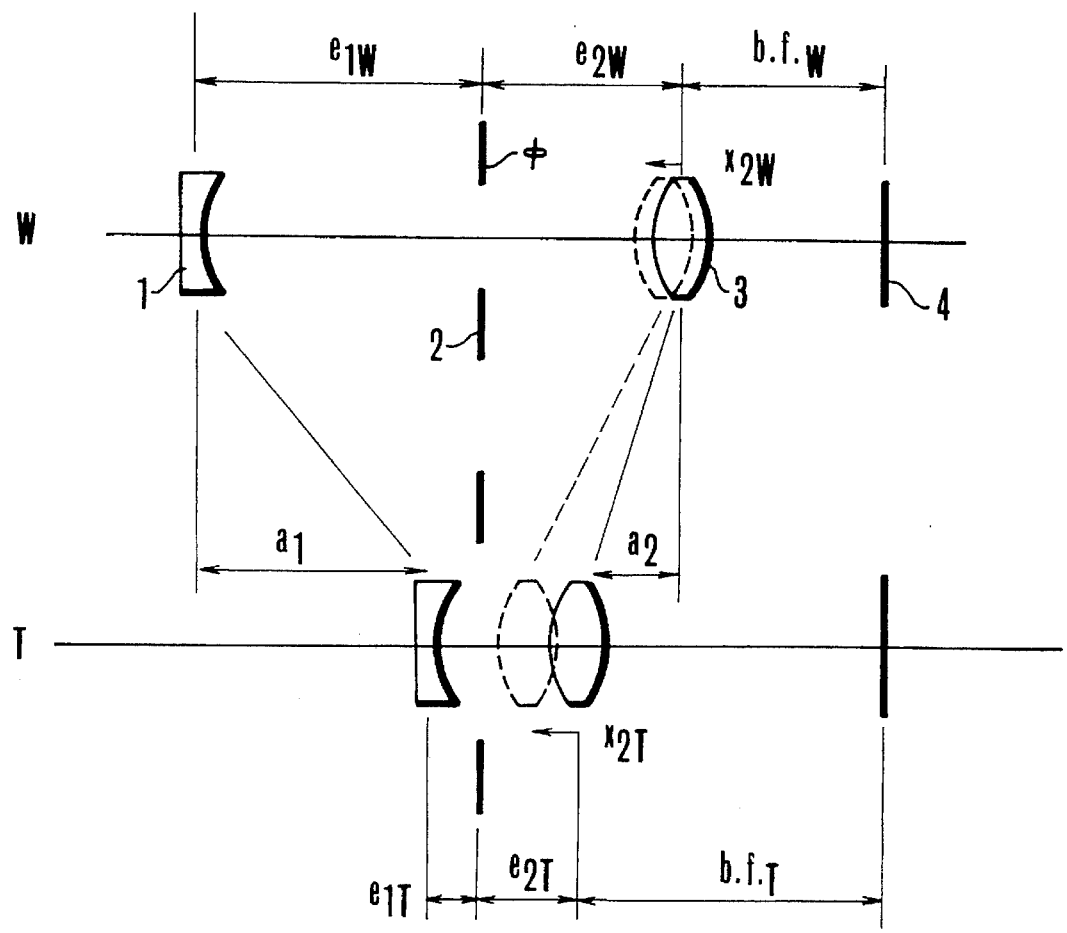
FIG. 2 is a diagram to explain the reason why the exposure correction is necessary.

Next, the fact that as the second lens group 3 behind the diaphragm 2 moves, the F-number varies although the aperture diameter remains unchanged, is explained by using the diagram of FIG. 2 and the symbols in FIG. 1 and FIG. 2.

In FIG. 2, the exit pupil is enlarged by the lens action of the second lens group 3. At this time, letting the ratio of the diameter of the exit pupil to the real aperture diameter $\phi$ be denoted by $\beta$, the diameter of the exit pupil becomes $\beta \cdot \phi$. Letting the distance between the diaphragm 2 and the second lens group 3 be denoted by $e_2$, and the distance between the second lens group 3 and the image plane (or the back focal distance) by b.f.; the distance between the image plane and the exit pupil is found to be "$\beta e_2 + b.f.$". Hence, the F-number is calculated by the following equation:

$$F = (\beta e_2 + b.f.)/\beta \cdot \phi$$

Since $\beta$, $e_2$ and b.f. are unequivocally determined by the position of the second lens group 3, it is understood that the F-number varies with variation of the position of the second lens group 3. Therefore, regardless of what values the focal length and the object distance take, an adequate exposure can be obtained when the exposure correction corresponding to the change of the F-number is made by detecting the position of the second lens group 3.

Next, by showing a numerical example of the photographic lens, how much advantage can be expected from the exposure correction according to the invention is discussed.

Incidentally, the discussion is done by taking an example of the 3-times zoom with the use of ½ in. CCD. For a zooming range of 8 to 24 mm, an F-number of F2 in the wide-angle end, and a closest focusing distance of 70 cm, the following lens arrangement is possible as an example. In this case, the design parameters have the following values.

Incidentally, each symbol with a subscript 1 represents a parameter concerning the first lens group 1, a subscript 2 another one concerning the second lens group 3, a subscript W another one concerning the wide-angle end, and a subscript T another one concerning the telephoto end.

| Focal Length of Each Group | $f_1 = -32.21$ | $f_2 = 17$ |
|---|---|---|
| Principal Point Interval in Wide-Angle End | $e_{1W} = 38.9$ | $e_{2W} = 14.44$ |
| Principal Point Interval in Telephoto End | $e_{1T} = 1.63$ | $e_{2T} = 6.01$ |
| Back Focal Distance | $b.f._W = 21.22$ | $b.f._T = 29.65$ |
| Total Zooming Movement | $a_1 = 37.7$ | $a_2 = -8.43$ |
| Total Focusing Movement | $X_{2W} = -0.10$ | $X_{2T} = -4.35$ |
| Aperture Diameter | $\phi = \phi 8.82$ | |

With the photographic lens described above, as the second lens group 3 moves, the F-number changes as follows:

| Focal Length | F-Number | |
| --- | --- | --- |
| | Infinite Distance | Closest Distance (0.7 m) |
| Wide-Angle End (W) | F2 | F2 |
| Telephoto End (T) | F2.85 | F3.22 |

It is, therefore, apparent that not only the change of the F-number due to the variation of the zoom position, but also the change of the F-number due to the variation of the object distance, which, even if the zooming position remains unchanged at, for example, the telephoto end (T), ranges from F.2.85 to F3.22, must be taken into account when the exposure is corrected.

As has been described above, according to this embodiment, in the camera making the diaphragm position constant and provided with the zoom lens of which the lens group behind the diaphragm is moved during zooming and focusing, the exposure control can be made by detecting the position of the lens group which lies behind the diaphragm and correcting the exposure value based on the light value by the value of exposure correction corresponding to that lens position, thereby giving an advantage that an adequate exposure responsive to the brightness of the object and the variations of the zooming and focusing position can be always obtained.

And, it can provide a camera having exposure correcting means that can meet the demand of users of the electronic cameras using the photoelectric transducer element such as a CCD and also the demand of users who seek for richer gradation of tone and more beautiful pictures.

Figure 3:
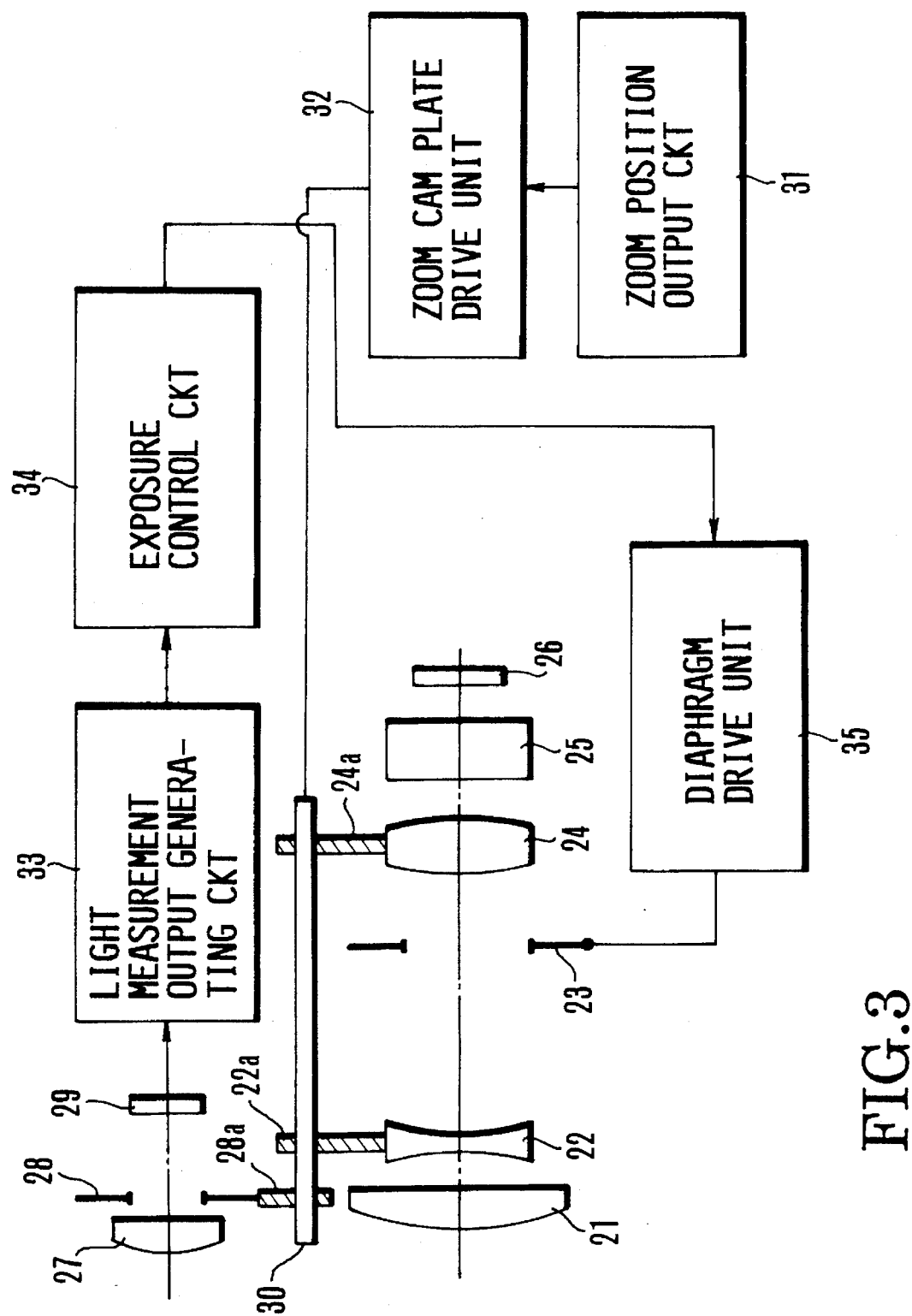
FIG. 3 is a view of the construction of another embodiment of the camera according to the invention.

FIG. 3 shows the construction of another embodiment of the camera according to the invention. In the same figure, a photographic lens comprises a first lens group 21, a second lens group 22, a diaphragm 23 and a third lens group 24 and is followed by a parallel flat plate 25 comprised of an optical low pass filter and an infrared cut filter, and an image sensor 26 such as a CCD. A collection lens 27 and a diaphragm 28 lie in front of a sensor 29 for light measurement. A zoom cam plate 30 has camming slots along which guide pins 22a, 24a and 28a of the second lens group 22, the third lens group 24 and the light measuring diaphragm 28 respectively, are moved. The camera further includes a zoom position output circuit 31, a zoom cam plate drive unit 32, a light measurement output generating circuit 33, an exposure control circuit 34 and a diaphragm drive unit 35.

Of the parts from the first lens group 21 to the image sensor 26 constituting the photographic system, the first lens group 21, the diaphragm 23, the parallel flat plate 25 and the image sensor 26 remain stationary during zooming. During zooming, the second lens group 22 moves from the object side to the image side, while the third lens group 24 moves from the image side to the object side.

Zooming is performed in such a way that a signal representing the zoom position indicated by a zoom switch (not shown) is output from the zoom position output circuit 31, and, responsive to this signal, the zoom cam plate drive unit 32 drives the zoom cam plate 30. In more detail, the zoom cam plate 30 has the camming slots cut therein so that the second lens group 22 and the third lens group 24 move along the respective camming slots by means of the guide pins 22a and 24a. If the diameter of the aperture opening of the diaphragm 23 is constant during this zooming time, the F-number changes, because, as has been described before, the exit pupil changes in position and size as the third lens group 24 moves.

The collection lens 27 through the light measuring sensor 29 constitute a light measuring system. To the light measuring diaphragm 28, as has been described before, the guide pin 28a is fixedly mounted so that when the zoom cam plate 30 moves by zooming, the diameter of the aperture opening of the light measuring diaphragm 28 varies as the guide pin 28a moves. It should be noted that when the F-number shifts to the darker side by zooming, it is better to proportionally stop down the light measuring diaphragm 28.

By taking the above-described features, the amount of light can be measured in correspondence to the change of the F-number as in the TTL light measurement. So, the output of the light measuring sensor 29 is produced by the light measurement output generation circuit 33, and the shutter speed and the aperture value are determined so as to obtain an adequate exposure by the exposure control circuit 34. The diaphragm drive unit 35 drives the diaphragm 23 according to the aforesaid aperture value.

In the above-described embodiment, because the zoom information is introduced into the light measuring system through the zoom cam plate 30, the correction due to the zoom position may not be applied to the light measurement output.

For example, the light measuring diaphragm may be made to cooperate with the zooming mechanism in such a manner that, on the assumption that the F-number of this photographic lens varies to F2-F2.5 over the range from the wide-angle end to the telephoto end, the light measuring diaphragm is stopped down from a value in the aperture size of, say, "1" in the wide-angle end, to a value of "0.8".

According to the present embodiment, in the camera having the external light measuring device and the zoom lens whose F-number varies with zooming, an arrangement is made such that the size of diaphragm aperture in the light measuring system varies with zooming. Therefore, the means for detecting the zoom position and the computing of the aperture size with the variation of the zoom position become unnecessary. That is, there is an advantage that the exposure control system can be simplified.

Though, in the present embodiment, the size of light measuring diaphragm aperture has been made variable in response to zooming, the collection lens may otherwise be moved forward in response to zooming when changing the F-number. On consideration of it in connection with the above-described numerical example, focusing may be carried out so that the back focal distance of the lens becomes 1.25 times as large.

Also, though the embodiment has been described in connection with an example of the photographic lens making its diaphragm constant relative to the image plane, the invention is applicable to the case where the diaphragm varies its axial position so that the F-number varies with zooming.

As has been described above, according to the embodiment, there are provided the variable means for varying the F-number of the light measuring system and the drive means for driving the aforesaid variable means in response to zooming, thereby making the F-number of the light measuring system to vary with zooming, and, based on this, controlling the F-number of the photographic system. This enables the computing means for finding the change of the F-number of the light measuring system resulting from the zooming to be unnecessary. Hence, the exposure control system can be simplified.

What is claimed is:

1. A camera comprising:

(a) a first lens group for controlling zooming operation;

(b) a diaphragm arranged behind said first lens group for controlling exposure operation;

(c) a second lens group arranged behind said diaphragm, for a focusing operation and said zooming operation;

(d) light measuring means for measuring light intensity, said light measuring means being separately arranged from said first and second lens groups;

(e) exposure control means for controlling said diaphragm on the basis of an output of said light measuring means; and (f) correction means for correcting said exposure according to a position of said second lens group at least in infinite distance when in said zooming operation.

2. A camera according to claim 1, further comprising image pickup means for photoconverting an optical image formed by said second lens group into an electrical signal.

3. A camera according to claim 1, further comprising generating means for generating a signal corresponding to said position of said second lens group.

4. A camera in which focusing is performed by moving a lens group for controlling a focusing and a zooming operation between a diaphragm and an image plane, comprising:

(a) generating means for generating a position signal according to a position of said lens group; and (b) exposure control means for controlling an exposure condition based on said position signal at least in infinite distance when in said zooming operation.

5. A camera according to claim 4, further comprising additional zooming lens group before said diaphragm.

6. A camera according to claim 4, wherein said exposure control means controls said diaphragm.

7. A camera according to claim 4, further comprising image pickup means for photoconverting an optical image formed by said lens group into an electrical signal.

* * * * *

UNITED STATES PATENT AND TRADEMARK OFFICE
CERTIFICATE OF CORRECTION

PATENT NO. : 5,486,894
DATED : January 23, 1996
INVENTOR(S) : Kazuo Fujibayashi

It is certified that error appears in the above-indentified patent and that said Letters Patent is hereby corrected as shown below:

On the title page, under Related U.S. Application Data, after "abandoned" insert -- which is a continuation of Ser. No. 523,038, filed May 14, 1990, abandoned --.

On the title page, after Related U.S. Application Data, insert the following:

[30]  Foreign Application Priority Data

May 19, 1989   [JP]   Japan ...... 1-124558
June 30, 1989  [JP]   Japan ...... 1-166544

Col. 1, line 6, after "abandoned" insert -- which is a continuation of prior application Ser. No. 523,038, which was filed on May 14, 1990, now abandoned--.

Signed and Sealed this

Third Day of September, 1996

Attest:

BRUCE LEHMAN

Attesting Officer

Commissioner of Patents and Trademarks